(12) United States Patent
Quesselaire et al.

(10) Patent No.: US 10,592,906 B2
(45) Date of Patent: Mar. 17, 2020

(54) ELECTRONIC TRANSACTION SYSTEM AND A TRANSACTION TERMINAL ADAPTED FOR SUCH A SYSTEM

(71) Applicant: GEMALTO SA, Meudon (FR)

(72) Inventors: Dominique Quesselaire, Cachan (FR); Jean-Paul Mengus, Montmagny (FR); Michel Leger, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 745 days.

(21) Appl. No.: 14/594,842

(22) Filed: Jan. 12, 2015

(65) Prior Publication Data

US 2015/0127543 A1 May 7, 2015

Related U.S. Application Data

(62) Division of application No. 10/586,128, filed as application No. PCT/IB2005/000070 on Jan. 13, 2005.

(30) Foreign Application Priority Data

Jan. 16, 2004 (EP) .................................... 04290122

(51) Int. Cl.
| | |
|---|---|
| *G06Q 20/40* | (2012.01) |
| *G06Q 20/34* | (2012.01) |
| *G06Q 20/02* | (2012.01) |
| *G06Q 20/20* | (2012.01) |
| *G07F 7/10* | (2006.01) |
| *G06Q 20/32* | (2012.01) |
| *G07G 1/00* | (2006.01) |
| *G07G 1/14* | (2006.01) |

(52) U.S. Cl.
CPC ......... *G06Q 20/409* (2013.01); *G06Q 20/027* (2013.01); *G06Q 20/20* (2013.01); *G06Q 20/32* (2013.01); *G06Q 20/347* (2013.01); *G06Q 20/4012* (2013.01); *G06Q 20/4014* (2013.01); *G07F 7/10* (2013.01); *G07F 7/1075* (2013.01); *G07G 1/0009* (2013.01); *G07G 1/14* (2013.01)

(58) Field of Classification Search
CPC .................................................. G06Q 20/409
See application file for complete search history.

(56) References Cited

U.S. PATENT DOCUMENTS

2009/0197645 A1* 8/2009 Specchio et al. ............. 455/558

\* cited by examiner

*Primary Examiner* — Jacob C. Coppola
(74) *Attorney, Agent, or Firm* — Osha Liang LLP

(57) ABSTRACT

A system for performing electronic transaction includes: a payment terminal including a human interface module, a first processor, and an internal bus for connecting these elements; a host terminal connectable to the human interface module through a connection; and a security module. The human interface module includes a keyboard, a display, a card reader for reading and authenticating a bank card or credit card. The host terminal includes a second processor, a memory, and a power supply. A transaction terminal task manager is included in the first security module, the first security module being hosted in the host terminal. The human interface module executes transaction phases under control of the security module, and executes security treatments, totally autonomously from the host terminal. The security treatments include presentation of a PIN code to the bank card or credit card.

8 Claims, 3 Drawing Sheets

ELECTRONIC TRANSACTION SYSTEM AND A TRANSACTION TERMINAL ADAPTED FOR SUCH A SYSTEM

FIELD OF THE INVENTION

The invention relates to electronic transaction systems and transaction terminals adapted to perform electronic transaction. An electronic transaction is for example a payment transaction enabling payment of goods at a merchant store or a healthcare transaction enabling a patient to recover fees paid at the doctor, borrowing a book in a library, etc. . . .

BACKGROUND OF THE INVENTION

The payment terminal market is experiencing a price war, and at the same time due to the Europay MasterCard Visa EMV migration, new functionality are required. Further, the telecommunication environment is changing the global architecture of the transaction scheme.

Today, a transaction terminal has all the capabilities and resources to handle a transaction, namely: a PIN pad (keyboard for entering the user Personal Identification Number), a printer, a display, a card reader (either magnetic stripe card or microprocessor card), processing power and memory.

The features required from the transaction terminal are more and more resource demanding. The result is that the processing power and the memory size need to be increased. At the same time the security specifications become more and more severe.

SUMMARY OF THE INVENTION

One or more embodiments of the present invention provide an electronic transaction system and a transaction terminal adapted for such a system that overcomes the at least one shortcoming of the prior art methods and terminals.

The idea of the invention is to leverage on the capabilities of the telecommunication network, mobile telecommunication industry and the fact that processing power is more and more available (e.g., on personal computer PC, personal digital assistant PDA, mobile phone, or telecommunication router, etc. . . . ). According to the invention, instead of having all the resources in one terminal, the resources are distributed as follows:

1) a secured human interface module (Secured PIN Entry Device: SPED) comprising a display, a keypad, a smart card reader and/or a magnetic card reader and possibly a printer, 2) an electronic scheduler (e-scheduler), for example analog to Subscriber Identity Module SIM based, comprising a transaction terminal task manager, ciphering means and merchant contract management means (identification, fees, etc. . . . ), 3) a hosting device (PC, mobile phone, PDA, etc. . . . ) having processing means, memory and communication means, and [0010] 4) a gateway in the network or a remote server connectable to a service provider (of a bank or a financial institution, of a healthcare institution, etc. . . . ).

The gateway have different functionality, for example:
translation of protocols compliant with bank or healthcare institution (message format),
transaction uploading,
parameter downloading,
application boot downloading,
floor limit management (i.e., a level requiring an authorization for processing the transaction) by card holder,
data mining capabilities (loyalty programs, data consolidation for multilane merchant applications, local black, gray, . . . , list management, etc. . . . ),
secure communication with the e-scheduler.

Due to the significant decrease of the telecommunication cost, the system according to the invention enables a substantial cost reduction of the price of the transaction terminal.

BRIEF DESCRIPTION OF THE DRAWINGS

The following detailed description, given by way of example, will be best understood with the accompanying drawings in which.

DETAILED DESCRIPTION OF THE INVENTION

Figure 1:
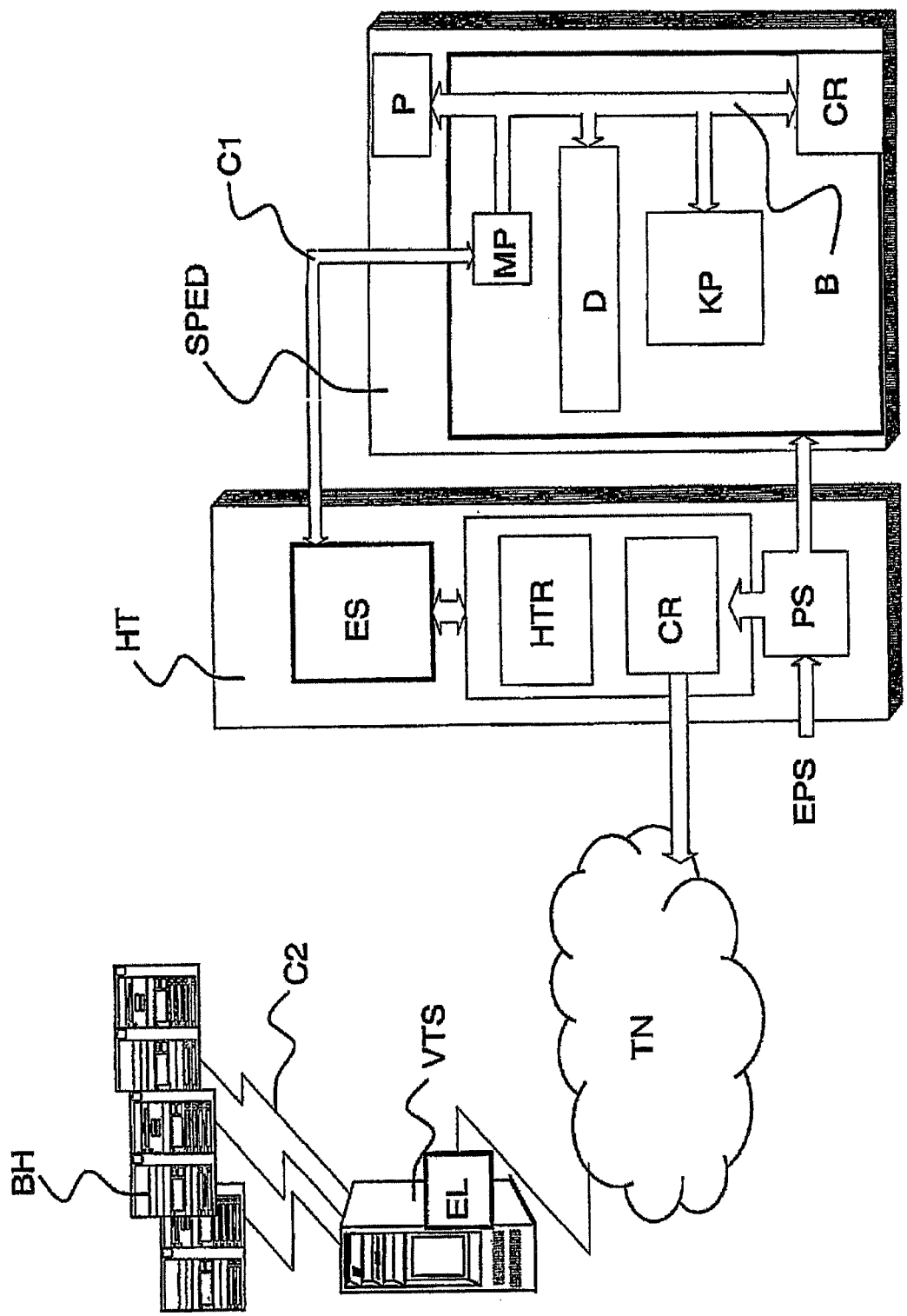
FIG. 1 represents schematically an electronic transaction system according to the invention.

An example of payment transaction involving for example a mobile phone (e.g., compliant with GSM) will be described in more details in relation with FIG. 1. A human interface module SPED is connected by a wire or a wire-less connection C1 to a hosting terminal HT, for example a mobile phone. The hosting terminal HT enables to communicate with an application host or virtual terminal server VTS through an existing public or private telecommunication network TN. The virtual terminal server VTS is further able to communicate by adapted communication means and networks C2 with the information processing systems of bank(s) BH.

The human interface module SPED comprises a keypad KP, a display D, a card reader CR, a processing means MP connected to each other by an internal bus B. The human interface module SPED can also comprise a printer P. Advantageously, the human interface module SPED is secured in the sense that it is tamper evident or tamper proof. This means that a user is able to know (for example by seeing that the module was broken) When a fraud tentative to get his PIN is going to occur.

The hosting terminal HT is equipped with a security module or e-scheduler ES. The security module ES is comparable to a Subscriber Identity Module SIM card as currently used in the field of mobile telephony. The hosting means HT is connectable to the human interface module SPED through connection means C1. The processing means and the memory HTR of hosting means can be used by the scheduler means ES for helping in performing various task. The hosting means HT also comprises communication means CR for exchanging data using the telecommunication network TN. A power supply either internal PS, e.g., a battery or external EPS, e.g., electricity network are a source of energy to the hosting terminal HT and also to the human interface module SPED.

The payment terminal comprises the hosting terminal, i.e., the mobile phone, the human interface module SPED and the security module ES. The payment terminal performs the phases of the transaction which involves directly the following actors: the merchant who need to be paid for goods sold or services offered and the customer carrying the means of payment (a bank or a credit card). The transaction phases comprises the entry of the amount to be paid with the keypad KP, reading and authentication of the bank or credit card through the card reader CR and the processing means MP, entry of the PIN code through the keypad KP, displaying of the instruction to be followed on the display D, possibly editing of payment ticket with the printer P. The human interface module SPED executes these transaction phases under the e-scheduler ES control. However, the human interface module SPED executes totally autonomously the treatments regarding security (display the message asking for PIN code entry, entry of the PIN code, presentation of the PIN code to the card, generation of the ciphered PIN data . . . ).

The communication between the human interface module SPED and the e-scheduler ES through the mobile phone is secured by ciphered data exchange. The cryptographic keys are generated uniquely after a mutual identification of the human interface module SPED and the e-scheduler ES.

In an analogous way, the communication between the virtual terminal server VTS and the e-scheduler ES through the mobile phone HT and the telecommunication network TN is secured by mutual identification proceeding and the used of cryptographic keys. The virtual terminal server VTS can comprise a security module EL (e-link) analog to a SIM card. The security module EL can be in relationship with one or more e-scheduler(s). The main task of the security module EL is to allow a secure communication of data between the virtual terminal server VTS and the hosting terminal HT (in the present example the mobile phone).

The e-scheduler uses its host HT (in the present example the mobile phone) to store bulky data without any security requirements connection: e.g., fonts definition, printing format, etc. . . . The e-scheduler ES and the virtual terminal server VTS contributes to carry out in a distributed way an equivalent of a payment transaction currently carried out on a point-of-sale or payment terminal. A virtual terminal can be seen when considering the addition of all the functionality of the human interface module SPED, the hosting terminal HT including the e-scheduler ES and the virtual terminal server VTS including the security module e-link EL.

The scheduler means ES is specific to the electronic transaction application to be performed for example a banking application, or a healthcare application, etc. . . .

Figure 2:
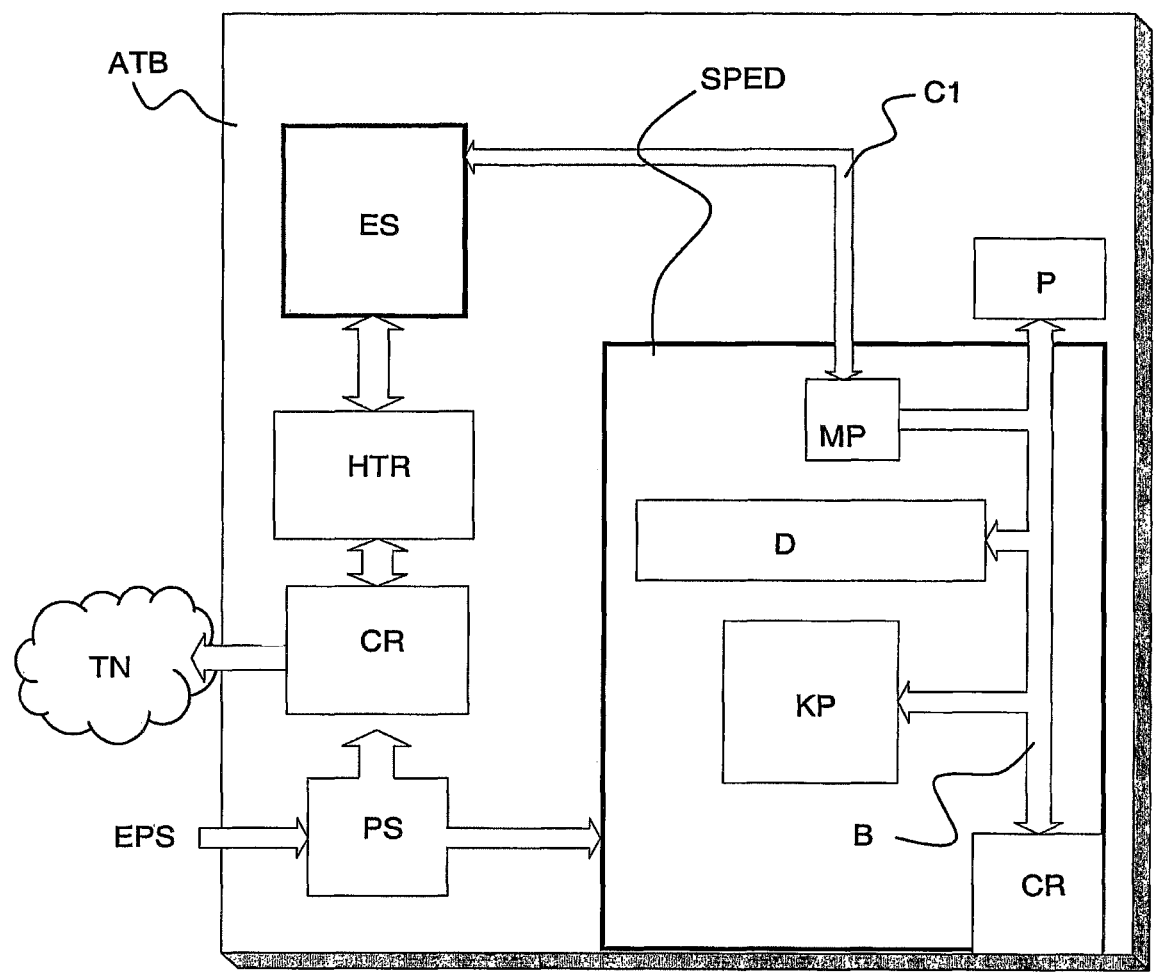
FIG. 2 illustrates a particular embodiment of a transaction terminal adapted for a system according to the invention.

FIG. 2 shows a particular embodiment of a transaction terminal adapted for a system according to the invention in which the human interface module SPED and the hosting terminal HT are grouped in one device ATB. This device can be a specific device which include all the functionality of the human interface module SPED and the hosting terminal HT. Alternatively, it can also be for example a personal computer PC, a personal digital assistant PDA, or a mobile phone In all these examples, advantageously, the device is tamper evident or tamper proof, so that a user knows when a fraud tentative to get the user PIN is occurring.

Figure 3:
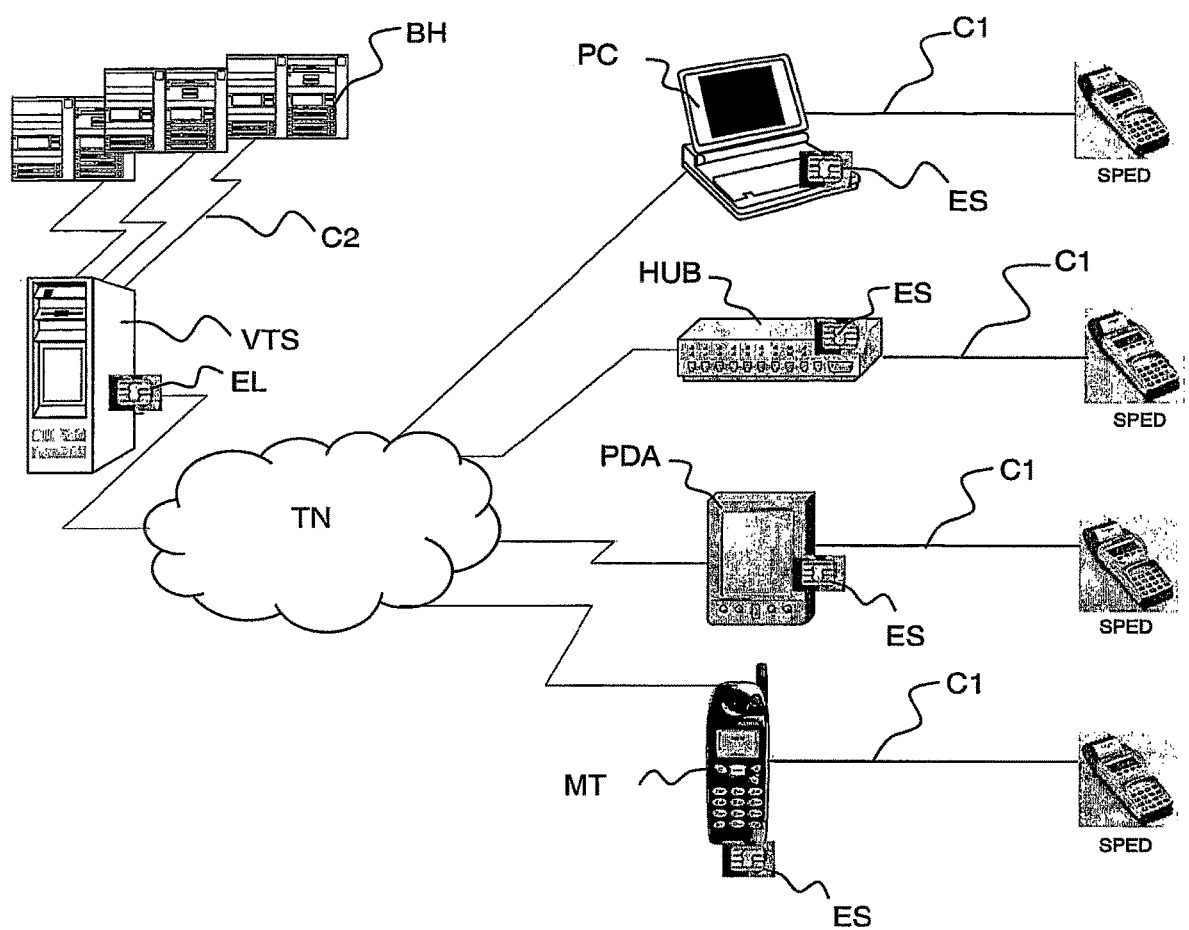
FIG. 3 illustrates different embodiments of a hosting device in an electronic transaction system according to the invention.

FIG. 3 shows schematically different embodiments of a hosting device in an electronic transaction system according to the invention, from top to down of the Figure a personal computer PC, a network hub HUB, a personal digital assistant PDA, and a mobile phone MT respectively. The links shown on the Figure between the different devices/systems/terminals can be wired or wireless. The e-scheduler ES and the security module e-link EL are inserted or connected into the respective devices in an appropriate manner, known by the man skilled in the art.

With the system of the invention, it is possible to cheaply adapt the whole system to different type of electronic transaction banking, healthcare, library . . . simply by changing the scheduler means ES. Also it is possible to use the resources where they are already available, e.g., the hosting terminal or the virtual terminal server (the gateway) while having a basic and cheap but secure human interface module.

What is claimed is:

1. A system for performing electronic transaction comprising:
   a payment terminal including:
      a human interface module comprising a keypad, a display, a card reader, a first processor, and an internal bus connecting the keypad, the display, and the card reader; and
      a host terminal, connected to the human interface module through a first connection comprising: a second processor, a first memory, a power supply, and a first security module,
         wherein the first security module comprises a transaction terminal task manager and a second memory comprising a first cipher key and first identification data,
         wherein the first connection is established using the first cipher key and the first identification data; and
      a gateway or a remote server of a service provider, connected to the host terminal through a second connection over a telecommunications network, comprising a virtual terminal server, at least one communications interface and a second security module comprising a third memory, a second cipher key and second identification data, wherein the second connection is established using the second cipher key and the second identification data,
   wherein the human interface module receives a transaction request initiated using at least one selected from a group consisting of the keypad, the display, and the card reader, and wherein the human interface module transmits the transaction request to the first security module
   wherein the first security module processes the transaction request received by the human interface module and, using the transaction terminal task manager, schedules the execution of the transaction request as a plurality of transaction phases,
   wherein the human interface module executes, totally autonomously from the host terminal, one or more of the plurality of transaction phases, as scheduled by the first security module,
   wherein non-sensitive data is stored on the host terminal and sensitive data is stored on the gateway or remote server, and wherein the non-sensitive and sensitive data pertains to the plurality of transaction phases, and
   wherein the host terminal communicates with the gateway or remote server to receive data stored on the gateway or remote server, in connection with the transaction request.

2. A payment terminal adapted to perform electronic transactions, the payment terminal comprising:
   a payment terminal including:
      a human interface module comprising a keypad, a display, a card reader, a first processor, and an internal bus connecting the keypad, the display, and the card reader; and
      a host terminal, connected to the human interface module through a first connection, comprising: a second processor, a first memory, a power supply, and a first security module, wherein the first security module comprises a transaction terminal task manager and a second memory comprising a first cipher key and first identification data, wherein the first connection is established using the first cipher key and the first identification data, wherein the human interface module receives a transaction request initiated using at least one selected from a group consisting of the keypad, the display, and the card reader, and wherein the human interface module transmits the transaction request to the first security module wherein the first security module processes the transaction request received by the human interface module and, using the transaction terminal task manager, schedules the execution of the transaction request as a plurality of transaction phases, wherein the human interface module executes, totally autonomously from the host terminal, one or more of the plurality of transaction phases, as scheduled by the first security module.

3. The system for performing electronic transaction of claim 1, wherein the plurality of transaction phases comprises:

receiving an amount to be paid with the keypad;

reading a first data from a bank card or credit card by the card reader;

receiving a PIN by the keypad;

authenticating the PIN based on the first data; and transmitting the amount and the PIN to the host terminal.

4. The payment terminal adapted to perform electronic transactions of claim 2, wherein the plurality of transaction phases comprises:

receiving an amount to be paid with the keypad;

reading a first data from a bank card or credit card by the card reader;

receiving a PIN by the keypad;

authenticating the PIN based on the first data; and transmitting the amount and the PIN to the host terminal.

5. The system of claim 1, wherein the first security module is a Subscriber Identity Module (SIM) Card.

6. The system of claim 5, wherein the second security module is a SIM Card.

7. The system of claim 2, wherein the first security module is a Subscriber Identity Module (SIM) Card.

8. The system of claim 7, wherein the second security module is a SIM Card.

* * * * *